United States Patent [19]
Landphair et al.

[11] Patent Number: 5,161,473
[45] Date of Patent: Nov. 10, 1992

[54] SEED DISTRIBUTION SYSTEM AND METHOD FOR A SEEDING IMPLEMENT

[75] Inventors: Donald K. Landphair, Bettendorf; Lowell H. Neumeyer, Des Moines, both of Iowa; David J. Rylander, Victoria, Ill.

[73] Assignee: Deere & Company, Moline, Ill.

[21] Appl. No.: 701,939

[22] Filed: May 17, 1991

[51] Int. Cl.⁵ .......................... A01C 1/00; A01C 7/00
[52] U.S. Cl. ................................ 111/176; 111/174; 111/900; 222/195; 222/630
[58] Field of Search .................. 111/174–176, 111/200, 900; 222/630, 637, 195

[56] References Cited

U.S. PATENT DOCUMENTS

| | | |
|---|---|---|
| 168,029 | 9/1875 | Körting . |
| 2,525,718 | 10/1950 | Parker . |
| 2,676,852 | 4/1954 | Kirkbride . |
| 2,758,564 | 8/1956 | Randall . |
| 2,955,877 | 10/1960 | Ecal . |
| 3,189,230 | 6/1965 | Gillespie . |
| 3,387,746 | 6/1968 | Whipple ........................ 111/174 |
| 3,482,735 | 12/1969 | Goulter . |
| 3,548,765 | 12/1970 | Grataloup ..................... 111/174 |
| 3,804,036 | 4/1974 | Seifert, Jr. . |
| 4,060,181 | 11/1977 | Grataloup . |
| 4,286,530 | 9/1981 | Conley . |
| 4,298,018 | 11/1981 | Haggard ........................ 222/630 |
| 4,399,757 | 8/1983 | Maury .......................... 111/174 |
| 4,473,016 | 9/1984 | Gust ............................ 111/174 |
| 4,474,327 | 10/1984 | Mattson et al. ................. 222/630 |
| 4,503,786 | 3/1985 | Tautfest ........................ 111/174 |
| 4,562,968 | 1/1986 | Widmer et al. ................. 111/175 |
| 4,919,303 | 4/1990 | Boudreault ..................... 222/637 |

FOREIGN PATENT DOCUMENTS 207440 11/1970 U.S.S.R. ............................ 111/174

*Primary Examiner*—Randolph A. Reese
*Assistant Examiner*—Spencer Warnick

[57] ABSTRACT

A seed distribution system includes an upright main hopper for containing a mass of seeds. The input end of a seed tube projects into the lower portion of the hopper near the bottom of the seed mass. The input end of the seed tube is located within the output end of an air supply tube and terminates inwardly of the supply tube. The seeds in the main hopper are pneumatically captured by creating a generally dome-shaped area in the seeds adjacent the input end and sweeping seeds from the area into the input end. The captured seeds are propelled through the seed tube to a secondary hopper adjacent a seed metering device. To provide automatic level control, the delivery end of the seed tube is supported within the secondary hopper so that, as the seed level rises in the hopper, air flow and thus seed delivery rate will decrease. Automatic seed distribution from the bottom of the central hopper to the secondary hopper is accomplished simply and reliably with no moving parts other than those associated with the source of air.

35 Claims, 1 Drawing Sheet

SEED DISTRIBUTION SYSTEM AND METHOD FOR A SEEDING IMPLEMENT

BACKGROUND OF THE INVENTION

1. Field of the Invention

The present invention relates generally to a seeding implement and more specifically to a seed distribution system for a planter or grain drill or the like.

2. Related Art

Seeders and planters which have individual metering devices with corresponding hoppers located across the width of the implement require individual filling of each hopper which can be quite time consuming and inconvenient. In the past, implements with a single material storage area often had metering systems located a substantial distance from the furrow opener, and seed placement with such implements was less precise than those that have metering devices near the opener. Although various types of air systems exist for supplying individual row meters from a central hopper, heretofore there has not been a reliable and yet simple and inexpensive single point fill structure for use with individual meters. Most central hopper implements are relatively complex and include a number of moving parts.

BRIEF SUMMARY OF THE INVENTION

It is therefore an object of the present invention to provide an improved seed distribution system for a planting implement. It is another object to provide such a system wherein seed from a central hopper is distributed to a plurality of secondary or mini-hoppers located adjacent seed meters.

It is a further object of the present invention to provide an improved seed distribution system having a minimal number of moving parts. It is a further object to provide such a system which is relatively inexpensive and yet highly reliable. It is still another object to provide such a system which includes a main storage hopper that feeds a plurality of mini-hoppers, wherein automatic level control in the mini-hoppers is achieved without moving parts.

It is yet another object of the present invention to provide an improved seed distribution system for pneumatically conveying seeds from the bottom of a mass of seeds in a hopper to locations adjacent planter or drill row units. It is a further object to provide such a system which requires no moving parts other than a fan and wherein the seed delivery rate is easily adjustable.

A seed distribution system constructed in accordance with the teachings of the present invention includes an upright main hopper for containing a mass of seeds. The input end of a seed tube projects into the lower portion of the hopper near the bottom of the seed mass. A source of air pressure is communicated to the hopper in the area of the seeds around the input end to pneumatically capture seeds in the seed tube and propel the captured seeds through the tube to a secondary hopper adjacent a seed metering device. To provide automatic level control, the delivery end of the seed tube is supported within the secondary hopper to provide a self-throttling effect so that, as the seed level rises in the hopper, air flow and thus seed delivery rate will decrease.

The seeds in the main hopper are pneumatically captured by creating a generally dome-shaped area of seeds and air adjacent the input end of the seed tube and propelling seeds from the area into the input end. The air outlet for creating the dome-shaped area directs air in a first direction into the seed mass adjacent the input end of the seed tube and exhausts the air in a second direction substantially different from the first direction. Preferably, the input end of the seed tube is located within the output end of the air supply tube and terminates inwardly of the supply tube. The tube spacing is small to prevent seeds from moving into the area between the tubes.

Automatic seed distribution from the bottom of the central hopper to the secondary hoppers is accomplished simply and reliably with no moving parts other than those associated with the source of air. Seed delivery rate through the seed tubes can be adjusted by changing the location of the input end of the seed tube relative to the output end of the air supply tube and by changing the angle of the tubes in the mass of seeds. A clean-out door located in the bottom of the central hopper adjacent the tubes facilitates servicing and adjustment of the unit.

These and other objects, features and advantages of the present invention will become apparent to one skilled in the art upon reading the following detailed description in view of the drawings.

DETAILED DESCRIPTION OF THE DRAWINGS

Figure 1:
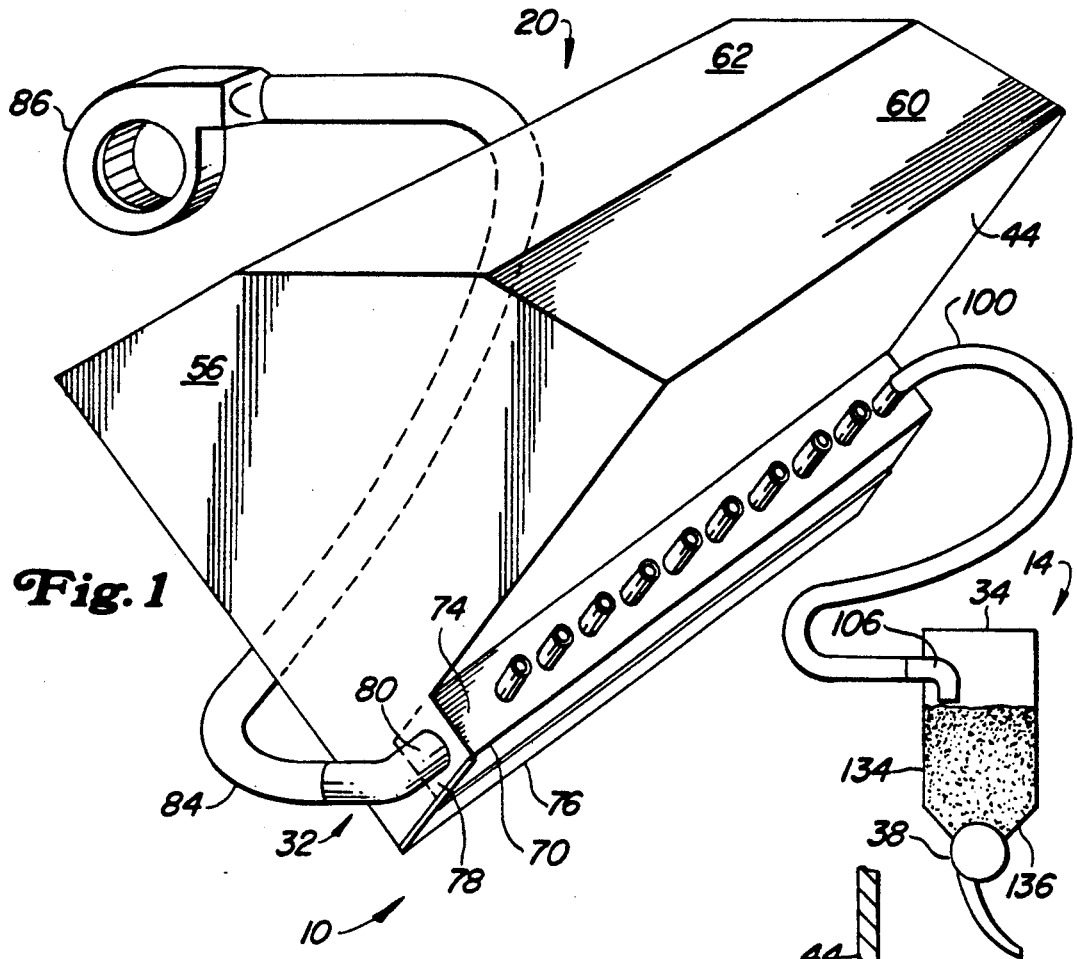
FIG. 1 is a perspective view of a portion of a seeding implement including an air distribution system.

Referring now to FIG. 1, therein is shown a portion of a grain drill or similar seeding implement 10 having a transversely extending main frame. A plurality of planter row units 14 are spaced across the width of the frame for depositing seed in the ground in parallel rows.

A main or central seed hopper 20 is supported on the frame, and a seed distribution system indicated generally at 32 supplies seed from the hopper 20 to individual secondary or mini-hoppers 34 on each of the row units 14. A seed meter 38 meters seed from the mini-hopper 34 to a conventional seed boot assembly for deposit in a furrow formed by the opener device on the row unit 14.

The central seed hopper 20 includes an upright, transversely extending seed storage area 40 for containing a mass of seeds and facilitating delivery of the seeds from a bottom location 41 into the seed distribution system 32. The hopper 20 includes upright front and rear walls 42 and 44 with lower inwardly converging bottom portions 46 and 48 for channeling seed to the location 41. A lowermost cleanout door 50 is hinged at 52 to selectively close and provide access to the location 41 and the input area of the distribution system 32. The sides of the hopper 20 are closed by end walls 56. A top 60 with inlet door 62 closes the upper portion of the hopper 20. When the doors 50 and 62 are closed, the hopper 20 is sealed so that the storage area 40 can be pressurized during operation.

Figure 2:
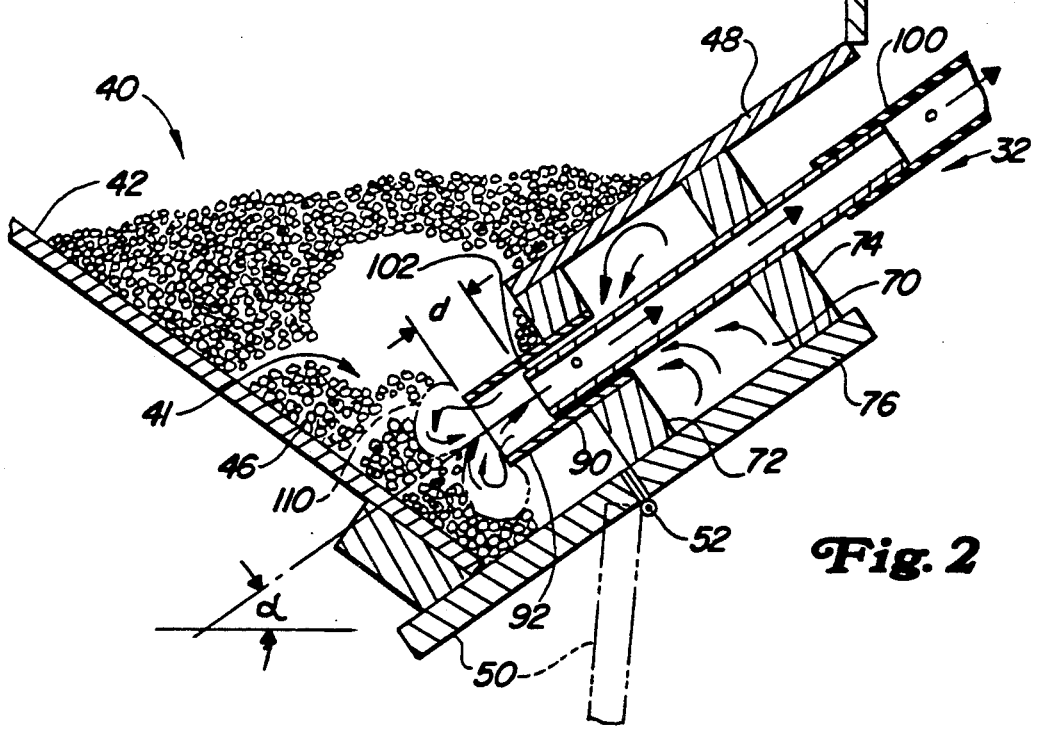
FIG. 2 is an enlarged side view of a portion of the air distribution system, partially in section, showing the action of the air to sweep seeds into the seed tube.

As best seen in FIG. 2, the bottom portion 48 which extends inwardly from the rear wall 44 terminates at a central location above the opposite bottom portion 46. An air gallery or manifold 70 extends substantially the width of the hopper 20 and includes a forward wall 72 which projects downwardly from the lower end of, and is perpendicular to, the bottom portion 48. The manifold 70 also includes a rear wall 74 extending parallel to the wall 72. A bottom wall 76 closes the lower portion of the manifold 70, and the bottom portion 48 defines the upper boundary of the manifold which has a generally rectangular cross section as shown. End walls 78 close the sides of the manifold, with an air inlet 80 located in one of the walls 78. An air supply line 84 attached to the inlet 80 is connected to the output of a constant pressure fan 86 to supply air to the manifold 70.

A plurality of air supply outlets 90 are supported in transversely spaced relationship along the length of the manifold forward wall 72. The outlets 90 are straight lengths of conduit with circular cross sections and end portions 92 which project into the lower portion of the mass of seeds within the hopper 20. The inner ends of the outlets 90 terminate along the inner surface of the forward manifold wall 72. Preferably, there is an individual outlet 90 associated with each of row units 14.

A seed tube 100 of circular cross section with diameter less than the inner diameter of the outlet 90 projects through the rear wall 74 of the manifold 70 and into the outlet, at an angle of greater than approximately twenty to twenty-five degrees from the horizontal. The inlet end 102 of the seed tube 100 is located inwardly from the end portion 92 of the corresponding outlet 90 with the distance (d) between the ends 102 and 92 being adjustable within a range of approximately one-half to three inches to also affect seed delivery rate. The seed tube 100 is slidably received in the rear wall 74 of the manifold 70 so that the distance d can be adjusted by moving the tube in the fore-and-aft direction. The seed tube 100 projects rearwardly and upwardly from the rear wall 74 of the manifold 70 and extends to an output end 106 (FIG. 1) located within the corresponding mini-hopper 34 to provide a self-throttling arrangement described in detail below.

Air blown into the air manifold 70 is directed through the outlets 90 between the inner surface of each outlet 90 and the outer surface of the end of the corresponding seed tube 100 associated with that outlet. The air creates a positive pressure near the outlet 90. A dome-shaped area of air and seeds or pocket 110 (see FIG. 2) is formed in the seed mass at the end 92 of the outlet 90. The air passing through the dome-shaped area 110 is exhausted through the seed tube 100, in a direction directly opposite the direction of input of the air (i.e., a change of direction of the air of approximately 180 degrees). The moving air sweeps seeds from the area 110 into the inlet end 102 of the seed tube 100. The seeds which are swept into the tube 100 are propelled to the output end 106 by the air exhausted from the pocket 110. The angle ($\alpha$) of the seed tube 100 with respect to the horizontal and the recessing of the seed tube end 102 within the outlet 90 help prevent seed build-up within the tubes that would cause slugging or inability to commence seed delivery on start up of the fan.

The angle ($\alpha$) of the seed tube 100 in the seed mass is preferably about thirty-five degrees with respect to the horizontal, although the angle can be adjusted to affect seed delivery rate and to optimize performance for different tube sizes. A steeper angle decreases seed delivery rate while a shallower angle increases rate. Below about twenty to twenty-five degrees, the seed tube 100 will slug with grain and become ineffective for delivering seed to the mini-hopper 34. Decreasing the distance d between the ends 92 and 102 increases delivery rate while increasing the distance d slows delivery. For the tube sizes given below: above approximately three inches of separation seed delivery stops completely; below about one-half inch of separation, the seed tube 100 slugs.

In addition to seed tube angle and tube end separation adjustments, conduit size and fan pressure can be changed to vary the seed delivery rate. Also, changing the height of the seed delivery tube 100 will affect seed delivery rate.

The separation between the outer wall of the seed tube end 102 and the inner wall of the outlet 90 is preferably kept small relative to the size of the seed so that the seed will not work back between the tubes and into the manifold 70 during transport. Using tubes with inner diameters of 1.0 inch and 1.59 inch for the seed tube 100 and the outlet 90, respectively, provides approximately equal air inlet and outlet areas and prevents corn, soybean and similar sized seeds from working into the manifold.

Each mini-hopper 34 has sidewalls 134 and a converging bottom portion 136 opening into the meter 38. The output end 106 of the seed tube 100 extends through the upper portion of the sidewall 134 and is supported within the hopper with the output end adjacent the sidewall and directed downwardly toward the bottom portion 136. As seed is delivered through the tube 100 and builds up within the hopper toward the end 106, a restriction to air movement through the end builds. As the seed reaches a preselected level in the hopper 34, the end 106 becomes restricted (see FIG. 1) to the point seed can no longer be propelled through the tube and seed delivery stops. As the seed is dispensed by the meter 38 and the level drops in the hopper 34 so that the restriction is removed, air flow increases sufficiently so that seed delivery is again commenced. Seed delivery to the hopper 34 then continues until the seed again reaches the preselected level.

Having described the preferred embodiment, it will become apparent that various modifications can be made without departing from the scope of the invention as defined in the accompanying claims.

We claim:

1. In a seeding implement having at least one furrow opener and an upright main hopper for containing a mass of seeds, an air distribution system for conveying the seeds from the hopper to the opener comprising:
    a seed tube having a first end opening toward the mass of seeds, and a second end for delivering seeds to the furrow opener;
    an air supply outlet;
    a source of air pressure connected to the outlet; and
    means supporting the air supply outlet for directing air into contact with the seed mass in a first direction adjacent the first end of the seed tube and means supporting the first end of the seed tube adjacent the air supply outlet for restricting seed build-up and seed delivery rate in the seed tube, wherein the directed air is exhausted from contact with the seed mass in a substantially opposite second direction.

2. The invention as set forth in claim 1 wherein the first end of the seed tube is located within the air supply outlet.

3. The invention as set forth in claim 2 including an air supply conduit projecting into and terminating within the mass of seeds, wherein the air supply outlet is defined by the supply conduit, and the first end of the seed tube is contained inwardly of the end of the supply conduit.

4. The invention as set forth in claim 1 wherein the means supporting the air supply outlet includes an air manifold and the air supply outlet projects from the air manifold into the mass of seeds, and wherein the seed tube extends out through the air manifold.

5. The invention as set forth in claim 4 wherein the first end of the seed tube terminates within the air supply outlet.

6. The invention as set forth in claim 5 wherein the first end of the seed tube and the air supply outlet have circular cross sections and the first end of the seed tube is generally coextensive with a portion of the air supply outlet.

7. The invention as set forth in claim 6 wherein the first end of the seed tube terminates axially inwardly of the air supply outlet a distance d, d being at least approximately one-half an inch.

8. The invention as set forth in claim 1 including a remote upright seed hopper connected to the furrow opener and in communication with the seed tube second end for receiving seeds therefrom and maintaining a mass of seeds substantially less than the mass of seeds contained in the main hopper.

9. The invention as set forth in claim 8 wherein the second end of the seed tube is responsive to the level of seeds in the remote seed hopper to restrict the air flow and thus seed flow through the seed tube.

10. The invention as set forth in claim 9 wherein the seed tube second end extends into the mass of seeds in the remote seed hopper for throttling air flow through the seed tube when the level of seeds in the remote hopper reaches a preselected height.

11. The invention as set forth in claim 1 wherein the first end of the seed tube extends into the lower end of the seed hopper near the bottom of the mass of seeds at an angle α with respect to the horizontal, α being at least approximately twenty-five degrees.

12. The invention as set forth in claim 11 further including a clean-out door located adjacent the first end of the seed tube.

13. In a seeding implement having at least one furrow opener and an upright main hopper for containing a mass of seeds, an air distribution system for conveying the seeds from the hopper to the opener comprising:
a seed tube having a first end opening toward the mass of seeds, and a second end for delivering seeds to one of the furrow openers;
an air supply outlet located adjacent the first end; and
means directing air from the air supply outlet into contact with the seed mass in a first direction to form an area of air and seeds in the seed mass, and means supporting the first end of the seed tube adjacent the area of air and seeds for exhausting the directed air, in a second direction substantially opposite the first direction, from contact with the seed mass to thereby cause seeds from the area of air and seeds to be swept into the seed tube.

14. The invention as set forth in claim 13 wherein the means supporting the first end of the seed tube includes means for supporting the first end within the air supply outlet.

15. In a seeding implement having at least one furrow opener and an upright main hopper for containing a seed mass, a method of conveying the seeds from the hopper to the opener comprising:

providing a seed tube with an input end and an output end, and projecting the input end into the hopper;
directing air flow into an area of the seed mass;
substantially reversing the direction of air flow within the seed mass while the air flow is in contact with the seed mass in the hopper;
pneumatically capturing seeds in the input end of the tube utilizing the changed direction air flow;
propelling the captured seeds through the tube towards the output end;
providing a secondary hopper of capacity substantially less than the capacity of the main hopper adjacent said at least one furrow opener; and
feeding the secondary hopper with seeds propelled through the seed tube.

16. The method as set forth in claim 15 wherein the step of pneumatically capturing seeds includes creating a generally dome-shaped pocket of air and seeds in the seed mass adjacent the input end and propelling seeds from the pocket into the input end.

17. The method as set forth in claim 15 including the step of controlling the flow of seeds through the seed tube dependent on the level of seeds in the secondary hopper.

18. The method as set forth in claim 17 wherein the step of controlling the flow of seeds includes reducing the air flow through the seed tube as the seed height rises in the secondary hopper.

19. The method as set forth in claim 18 wherein the step of reducing air flow includes supporting the second end of the tube within the secondary hopper such that the air flow through the seed tube is restricted as the seed height rises in the secondary hopper.

20. The method as set forth in claim 15 including the step of supporting the seed tube within an air tube, the step of communicating the source of air pressure to the hopper including blowing air into the hopper through the air tube and exhausting the blown in air through the seed tube.

21. The method as set forth in claim 20 including the step of supporting an air tube with an end within the hopper, wherein the step of supporting the seed tube includes terminating the seed tube within the air tube so that the input end of the seed tube is located inwardly from the end of the air tube.

22. The method as set forth in claim 21 wherein the step of terminating includes terminating the seed tube within the air tube a distance of between approximately one-half to three inches from the end of the air tube.

23. The method as set forth in claim 21 including the step of varying the seed delivery rate of the seed tube by adjusting the position of the air tube relative to the seed tube.

24. The method as set forth in claim 20 including the step of selecting the angle of the seed tube relative to the horizontal dependent upon the desired rate of flow of the seeds through the seed tube.

25. The method as set forth in claim 24 wherein the step of selecting the angle includes selecting an angle within a range of angles, the range of angles including thirty-five degrees.

26. The method as set forth in claim 15 wherein the step of pneumatically capturing includes capturing the seeds near the lower end of the seed mass.

27. The method as set forth in claim 26 wherein the step of communicating a source of air pressure comprises projecting an air tube of preselected cross-sectional area into the lower end of the seed mass, and the step of pneumatically capturing comprises providing the input end of the seed tube with a cross sectional area less than the preselected area and supporting the input end of the seed tube within the air tube.

28. The method as set forth in claim 27 including the step of preventing seeds from entering the area between the seed tube and the air tube by maintaining a separation between the tubes of less than the minimum dimension of a seed within the seed mass.

29. In an agricultural implement having an upright main hopper for containing a mass of material such as seeds, a method of conveying the material from the hopper to a location remote from the hopper, comprising:

directing a flow of air into an area of the mass in a first direction;
 generally reversing the flow of air within the mass while the air is in contact with the material;
 supporting a conveying tube with an input end adjacent the area; and
 directing material from the mass into the input end of the conveying tube utilizing the reversed flow of air.

30. The method as set forth in claim 29 including the step of restricting material delivery rate through the conveying tube by supporting the conveying tube within a second tube, the step of directing a flow of air into the area including blowing air between the conveying tube and the second tube.

31. The method as set forth in claim 30 including the step of recessing the input end of the conveying tube within the second tube.

32. The method as set forth in claim 29 including the step of supporting the input end of the conveying tube at an angle of between 20° and 35° with respect to the horizontal.

33. The method as set forth in claim 32 including the step of selecting the angle dependent upon the desired rate of flow of material through the delivery tube.

34. The method as set forth in claim 29 wherein the step of directing the flow of air into the area includes directing the air in a downward direction into the mass, and wherein the step of directing material from the mass includes directing the material upwardly into the input end.

35. In a seeding implement having at least one furrow opener and an upright main hopper for containing a mass of seeds, an air distribution system for conveying the seeds from the hopper to the opener comprising:

a seed tube having a first end for receiving seeds, and a second end for delivering the seeds to the furrow opener;
 an air supply outlet;
 means directing air from the air supply outlet into the seed mass to form an area of air and seeds in the seed mass;
 means for preventing slugging of the seed tube including means supporting the first end of the seed tube adjacent the air supply outlet for restricting flow of seeds into the first end of the seed tube; and wherein the means for supporting the first end of the seed tube adjacent the air supply outlet includes means for recessing the first end of the seed tube within the air supply outlet.

* * * * *